Oct. 11, 1932.  P. P. HORNI  1,881,588
LIGHT REFLECTING UNIT
Filed Oct. 8, 1930  2 Sheets-Sheet 1
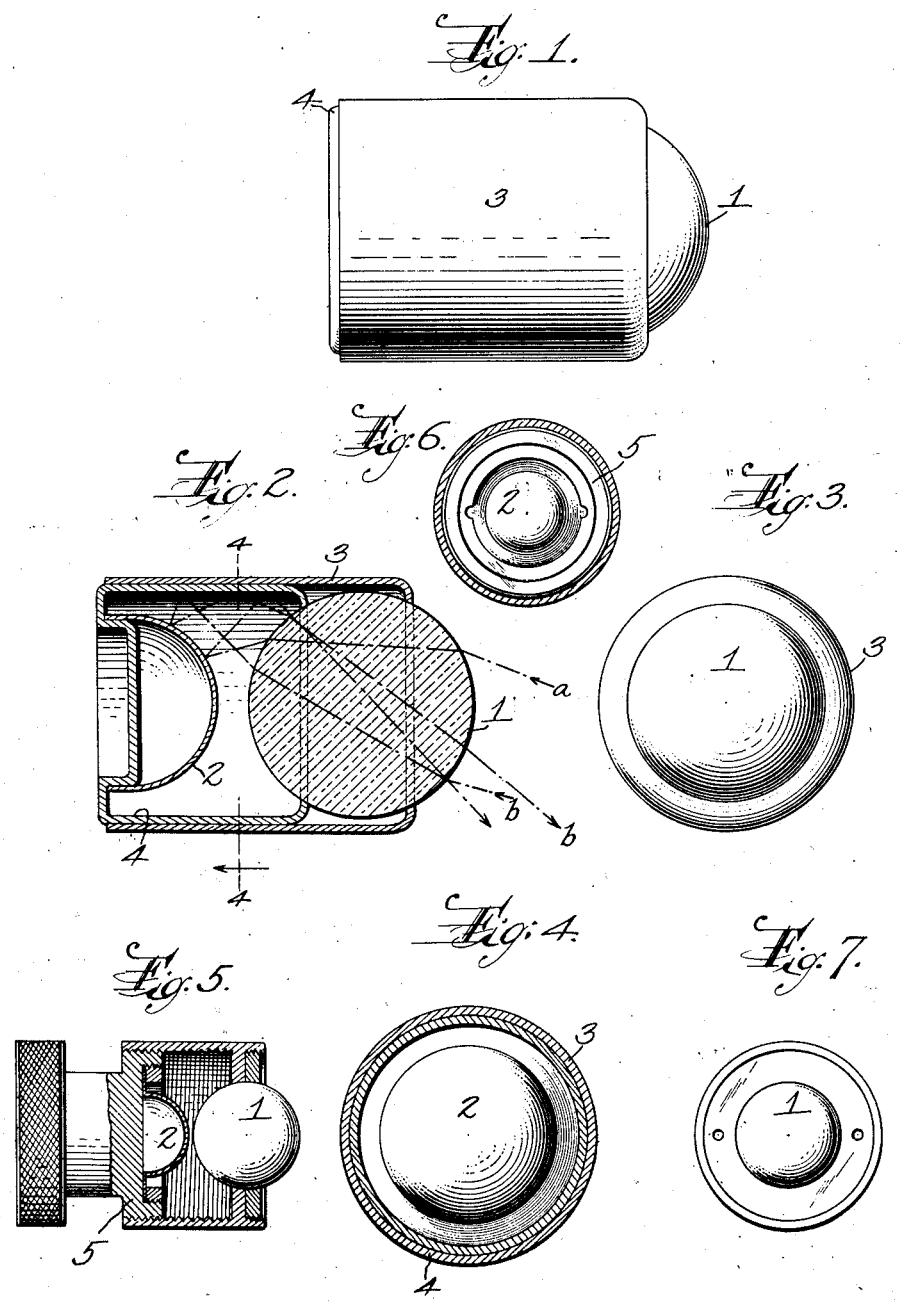
INVENTOR
Paul P. Horni
BY
Knight Bros
ATTORNEYS

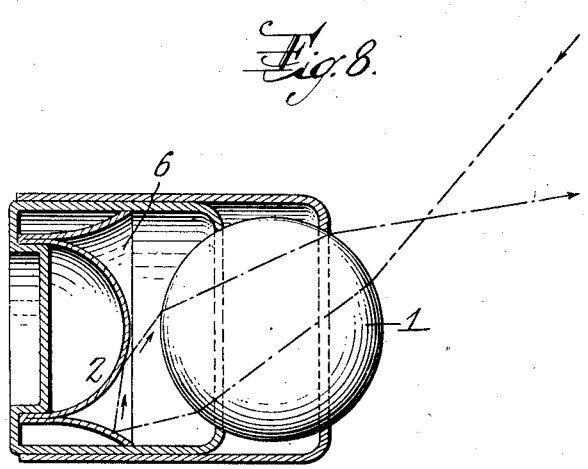
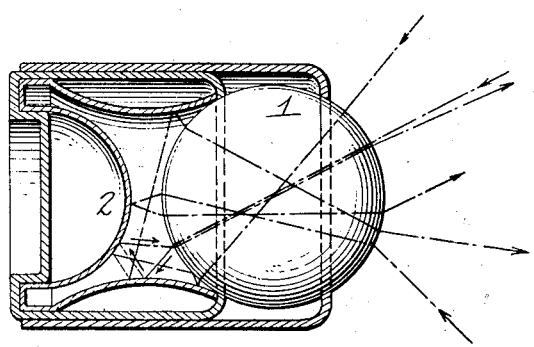
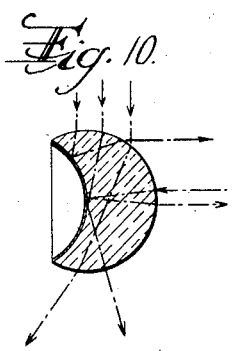 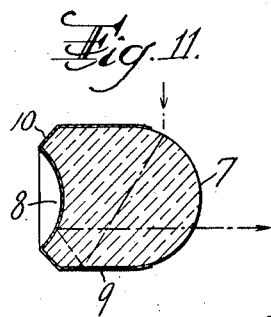 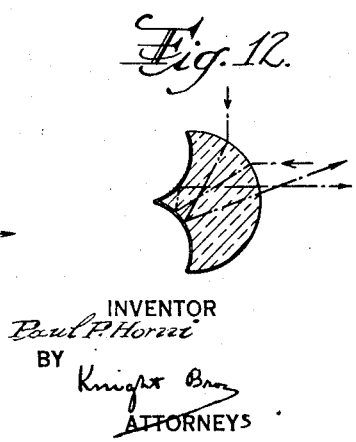
INVENTOR
Paul P. Horni
BY
Knight Bros
ATTORNEYS Patented Oct. 11, 1932

1,881,588

UNITED STATES PATENT OFFICE

PAUL P. HORNI, OF NEWARK, NEW JERSEY

LIGHT REFLECTING UNIT

Application filed October 8, 1930. Serial No. 487,171.

This invention relates to devices usually made in the form of glass buttons which are used for reflecting a ray of light back on itself. Such units have generally been made with a lens-like objective combined with some form of concave mirror located with its reflecting surface in or near the focus of the lens. When so constructed, such units give a brilliant reflection of any light beam impinging upon it at or near its optical axis, and variations have been made whereby, having the concave mirror slightly removed from the focus of the lens, more or less dispersion has been obtained.

The object of the present invention is to produce a unit that will possess a maximum amount of dispersive effect to the end that not only will a beam of light be reflected on itself along or near the optical axis, but such reflection may occur at considerable angles from such optical axis. A further object is to construct such units so that an incident ray may be reflected in a direction other than the incident direction, and this through a large angular range. Another object of the invention is to make the objective part of the unit a separate removable body of strong and cheap shape.

The principal feature of the invention comprises a combination with a convex refracting lens, and a convex reflector back of the lens which so acts to reflect in all directions any incident ray on the lens that is refracted onto the mirror as to give a brilliant glowing appearance to the lens, not only when viewed from the direction of the incident ray, but from any other direction even to the extent of 180°.

Various applications of the invention are illustrated in the accompanying drawings, in which Figure 1 is a side view of a completed unit mounted in a suitable casing.

Figure 2 is an axial section through the optical axis of the unit.

Figure 3 is a front view of the same.

Figure 4 is a transverse section on line 4—4 of Figure 2.

Figures 5, 6 and 7 are respectively, an axial section, a transverse section, and a front view of a modified form.

Figures 8 and 9 are other modifications of the assembly.

Figures 10, 11 and 12 show still other forms that the unit may take.

In a preferred form, the objective which is shown at 1 is made of a simple transparent glass sphere, as for example a glass marble. This form has the advantage of being cheap, easy to obtain, difficult to break, and when properly associated with a reflecting mirror, such as shown at 2, gives a very conspicuous appearance. The mirror 2 may be of any suitable shape so long as it is convex. A spherical shape has been found to be satisfactory. The refracting member 1 and the reflecting member 2 may be mounted in a casing which may consist of an outer member 3 and an inner member 4, the ball 1 being held between flanged lips on the two members. The members may be slid together to firmly grip the ball between the aforesaid lips. The inner member 4 may support the mirror 2, and it may itself have its interior cylindrical wall mirrored. In Figure 5 is shown in section a similar construction, but here the mirror is carried on an independent holder 5 at the rear which is made adjustable with reference to the outer casing, so as to render variable the distance between the refracting object glass 1 and the reflectors 2. It has been found that to get the most brilliant effect, this adjustment must be made with considerable nicety. When, however, the exact distance for the best results is ascertained for any given pair, then casings such as shown in Figure 2 may be accurately laid out to insure permanence of these results.

Referring to Figure 2, it will be noticed that the spherical lens 1 and the hemispherical reflector 2 have a common optical axis. Of course, rays impinging on the sphere along this axis would pass through the sphere and be reflected back on themselves from that part of the reflector 2 lying on the optical axis. Other rays, such as $a$ and $b$, may pass through the lens and, striking the hemispherical reflector 2, may be reflected to the interior wall of the casing 4, and again reflected to the objective 1, and may pass out at various angles.

In Figure 8, a combination of convex mirrors is shown in which there is combined with the hemispherical reflector 2, a flaring mirror 6. In Figure 9, the cylindrical wall of the inner casing may take a toric form, which will give still other combinations of rays. In Figure 10, a simple form of the combination, convex refractor and convex reflector, is shown, and the arrows indicate the variety of ways an incident ray may be reflected. In Figure 11, still another form is shown with a convex refracting objective formed of the hemispherical anterior portion 7, a spherical or other convex formed posterior reflector 8, and a cylindrical mirrored surface 9 between them. The cylindrical mirror 9 and convex mirror 8 may be applied to the glass in the ordinary manner of making mirrors. These two mirrors may be connected by a conical mirror 10, or such intermediate surface may be left open for the passage of light clear through the glass from front to rear, or vice versa. Figure 12 illustrates another form in which the convex mirror may be made. In this case, it is in the form of a spherical cusp, and the arrows indicate the various directions that rays may take when impinging on the front surface of the objective.

It will be observed that in all the units shown, there is a refracting objective of convex form, and in optical alinement therewith there is a mirror or mirrored surface which is also convex. The result of this combination is a dispersion of the rays so that the units will glow when light impinges thereon, and this glow will be visible not only from the direction of the incident ray, but also through a very wide angle.

Such devices are used in road signals for giving warning to a vehicle that is approaching a dangerous point, and also for giving warning from one vehicle to another, although they may be moving at considerable angles from each other. The device is also useful in advertising combinations, and has the further advantage of being rugged and durable. In case of injury to the objective, the ball may be easily removed and another one put in its place. The ball itself is so substantial that injury to the mirrored back of the ball is not likely to occur.

While various applications of the invention have been illustrated and described, the invention in its broadest sense is not to be construed as limited to any one of these devices, as there are many other forms that may be utilized.

I claim:

1. A light reflecting unit comprising in combination, a spherical refracting objective and a convex reflector, the two having a common optical axis and the crown of the reflector approximating the principal focus of the objective.

2. A light reflecting unit comprising in combination, a spherical refracting objective member, a convex reflecting member back of the sphere, and a casing in which said members are secured in optical alinement, said casing leaving exposed the front part of the sphere.

3. A combination as in claim 2, wherein the casing has two annular rims between which the sphere is held.

4. A combination as in claim 2, wherein the casing has means of adjusting the proximity of the two members.

5. A combination as in claim 2, wherein provision is made for renewing the sphere without disturbing the fixed optical proportions.

6. A combination as in claim 2, in which the casing is mirrored on its interior wall.

7. A combination as in claim 2, in which the mirrored wall is made convex in order to gather the maximum amount of light and reflect the same at the maximum range of angles.

PAUL P. HORNI.